(12) United States Patent
Pasha et al.

(10) Patent No.: US 11,245,600 B2
(45) Date of Patent: Feb. 8, 2022

(54) SYSTEM AND METHOD FOR PROCESSING NETWORK DATA

(71) Applicant: Citrix Systems, Inc., Fort Lauderdale, FL (US)

(72) Inventors: Syed Mansoor Pasha, Karnataka (IN); Mukesh Garg, Karnataka (IN); Zhiquan "Jeff" Xu, Danville, CA (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 16/515,344

(22) Filed: Jul. 18, 2019

(65) Prior Publication Data
US 2021/0021491 A1 Jan. 21, 2021

(51) Int. Cl.
H04L 12/26 (2006.01)
G06N 20/00 (2019.01)
H04L 12/24 (2006.01)

(52) U.S. Cl.
CPC .......... H04L 43/045 (2013.01); G06N 20/00 (2019.01); H04L 41/069 (2013.01)

(58) Field of Classification Search
CPC ...... H04L 43/045; H04L 41/069; G06N 20/00
USPC ....................................................... 709/224
See application file for complete search history.

(56) References Cited

U.S. PATENT DOCUMENTS

| | | | | |
|---|---|---|---|---|
| 5,751,914 A * | 5/1998 | Coley | ..................... | G06F 9/542 706/47 |
| 7,962,607 B1 * | 6/2011 | Chang | ..................... | H04L 43/04 709/224 |
| 9,146,763 B1 * | 9/2015 | Mehat | ................. | G06F 9/45533 |
| 10,511,498 B1 * | 12/2019 | Narayan | ............... | H04L 43/026 |
| 10,887,415 B1 * | 1/2021 | Manson | ................ | H04L 67/288 |
| 2012/0198463 A1 * | 8/2012 | Cheng | ................. | H04L 47/2433 718/103 |
| 2014/0201244 A1 * | 7/2014 | Zhou | ....................... | G06F 16/00 707/803 |
| 2016/0358101 A1 * | 12/2016 | Bowers | .................... | G06F 9/453 |
| 2017/0060622 A1 * | 3/2017 | Haughwout | .............. | G06F 9/54 |
| 2017/0063910 A1 * | 3/2017 | Muddu | ................. | G06F 3/0482 |

(Continued)

OTHER PUBLICATIONS

Aug. 7, 2018—M3: Uber's open source, large-scale metrics platform for prometheus. R. Skillington. Uber Engineering.

(Continued)

Primary Examiner — Schquita D Goodwin
(74) Attorney, Agent, or Firm — Banner & Witcoff, Ltd.

(57) ABSTRACT

Methods and systems for providing data analytics and generating real-time and historical views of network events using a single processing pipeline, managed by a single code base, are presented. A computing device may receive a stream of data indicative of a plurality of events occurring on a network. The computing device may process the stream of data to generate intermediate data and batch data using the single processing pipeline. The intermediate data may be available to generate historical views and the batch data may include a plurality of intermediate data for a time interval. The computing device may generate a historical view of the events based on a subset of intermediate data and the batch data. Finally, the computing device may provide the historical view to a processing layer to enable the computing device to respond to requests for information about the network.

22 Claims, 15 Drawing Sheets

(56) References Cited

U.S. PATENT DOCUMENTS

| | | | |
|---|---|---|---|
| 2017/0195439 A1* | 7/2017 | Dixon | G06F 21/56 |
| 2019/0042286 A1* | 2/2019 | Bailey | G06F 9/455 |
| 2019/0222597 A1* | 7/2019 | Crabtree | H04L 43/08 |
| 2019/0340041 A1* | 11/2019 | Banisadr | G06Q 10/107 |
| 2019/0379712 A1* | 12/2019 | Mota | H04L 65/403 |
| 2020/0034168 A1* | 1/2020 | Singleton, IV | G06F 9/45558 |
| 2020/0174840 A1* | 6/2020 | Zhao | G06N 3/084 |
| 2020/0186544 A1* | 6/2020 | Dichiu | H04L 63/1416 |

OTHER PUBLICATIONS

Jan. 20, 2016—Streaming 102: The world beyond the batch. T. Akidau. Data Science.
Oct. 9, 2020, International Search Report of PCT/US2020/041944.

* cited by examiner

SYSTEM AND METHOD FOR PROCESSING NETWORK DATA

FIELD

Aspects described herein generally relate to computer networking and hardware and software related thereto. More specifically, one or more aspects described herein provide data processing of network events.

BACKGROUND

Analytic services allow users to view real-time and historical events that occur on a network. Typically, these analytic services use two different processing pipelines, one for providing real-time views and another for providing historical views. To complicate matters, the real-time view processing pipeline and the historical view processing pipeline originate from two different code bases.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Aspects described herein are directed towards generating real-time and historical views of network events using a single processing pipeline and single code base. A computing device may receive a stream of data indicative of a plurality of events occurring on a network. The computing device may process the stream of data to generate intermediate data and batch data using a single processing pipeline. The intermediate data may be available to generate historical views. Further, the intermediate data may be displayed as a real-time event in a real-time view. Batch data may comprise a plurality of intermediate data for a time interval. The computing device may generate a historical view of the events based on a subset of intermediate data and the batch data. The computing device may respond to requests for information about the network, via a processing layer, based on the generated historical view. The computing device may store the intermediate data in a first memory and cause the intermediate data to be presented as a data point in a real-time view. Additionally, the batch data may be stored in a second memory, such as a temporal database. The intermediate data and batch data may be used to detect abnormal network conditions. For instance, the intermediate data may be compared to a threshold value, and when the intermediate data is greater than the threshold, an alert may be generated that indicates the abnormal condition. Batch data may also be compared to a threshold value to detect abnormal network conditions. When network conditions are normal (i.e. below the threshold value), the intermediate data and/or the batch data may be provided to a machine learning system to build a model of the network. In some embodiments, one or more network parameters may be adjusted when an abnormal network condition is detected.

Generating intermediate data and batch data using a single processing pipeline and a single code base provides better scalability than prior art systems that implement multiple code bases and multiple processing pipelines. In particular, the single processing pipeline and single code base reduces the consumption of processing resources and network bandwidth resources when compared to prior art systems that implement multiple code bases and multiple processing pipelines.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As discussed above, typical analytic services use two different processing pipelines from two different code bases. In operation, the two different code bases overlap in the tasks that are performed. For example, both code bases may read the same data multiple times. The need to perform multiple reads of the same data is inefficient, both in time and processing power. Aside from being inefficient, having multiple code bases does not scale well. Furthermore, maintaining two different code bases becomes increasingly complex over time and can lead to performance degradation due to discrepancies between the code bases.

To overcome limitations in the prior art described above, and to overcome other limitations that will be apparent upon reading and understanding the present specification, aspects described herein are directed toward generating real-time and historical views of network events using a single processing pipeline managed by a single code base. A single processing pipeline, as a function of a single code base, may provide an advantage over prior art systems that divide the processing across multiple pipelines and spread the functionality of these components across multiple code bases. In this regard, the single processing pipeline, executed by a single code base, reduces the complexity of maintaining multiple code bases and presents a more cost effective solution than prior art systems. Moreover, the single processing pipeline and single code base provides better scalability than systems that implement multiple code bases and multiple processing pipelines.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Figure 1:
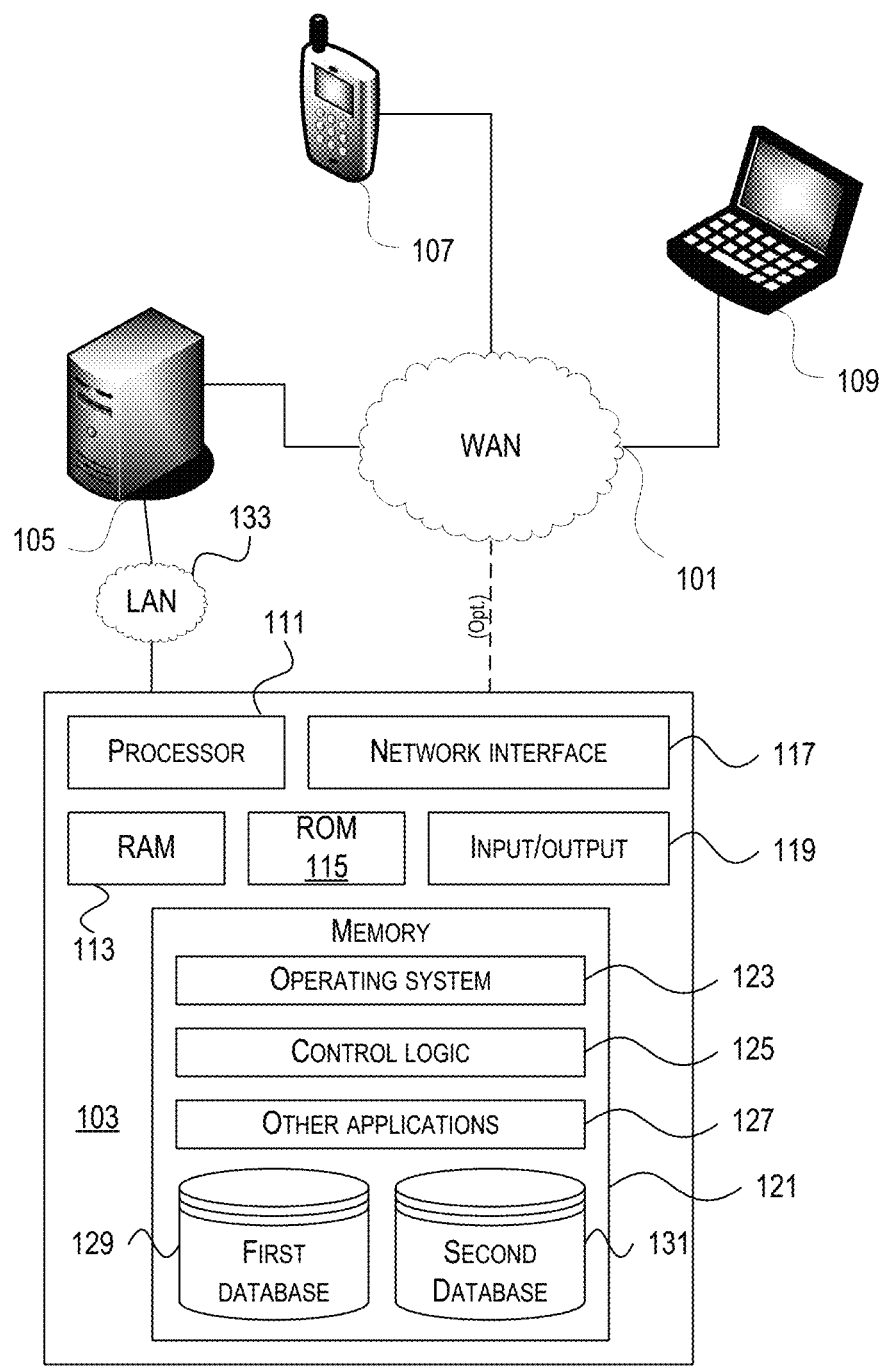
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
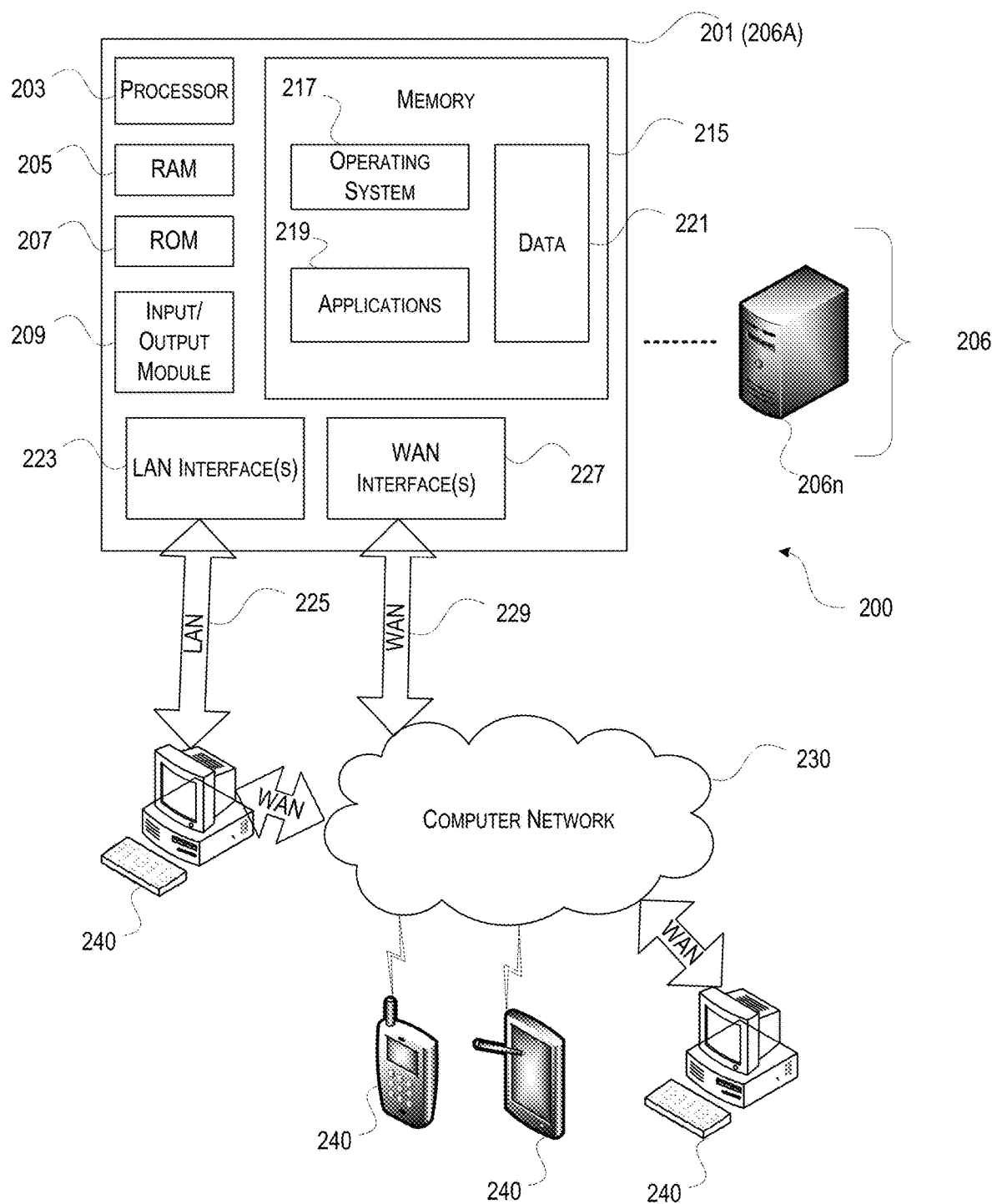
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
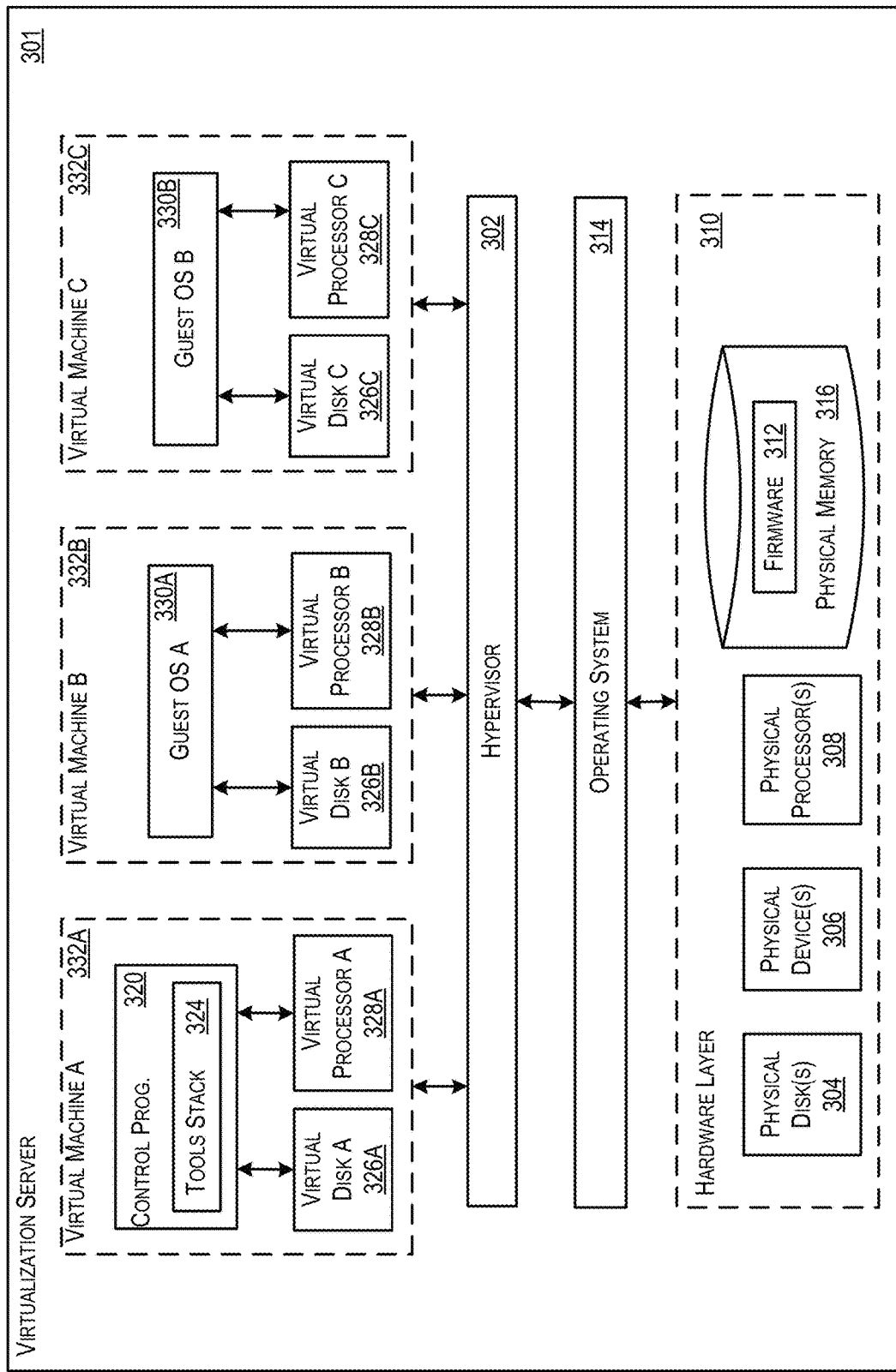
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, DomO, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
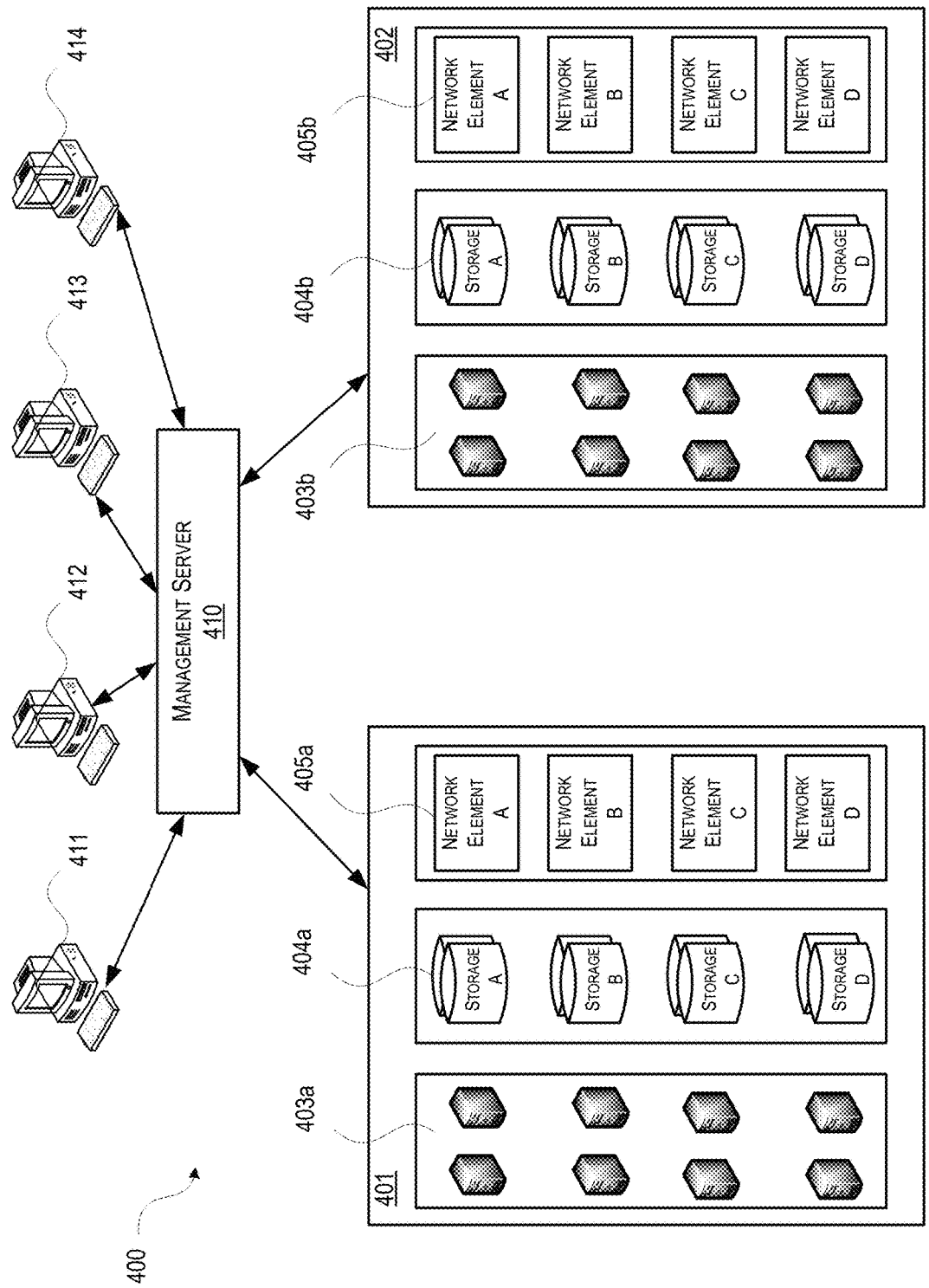
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
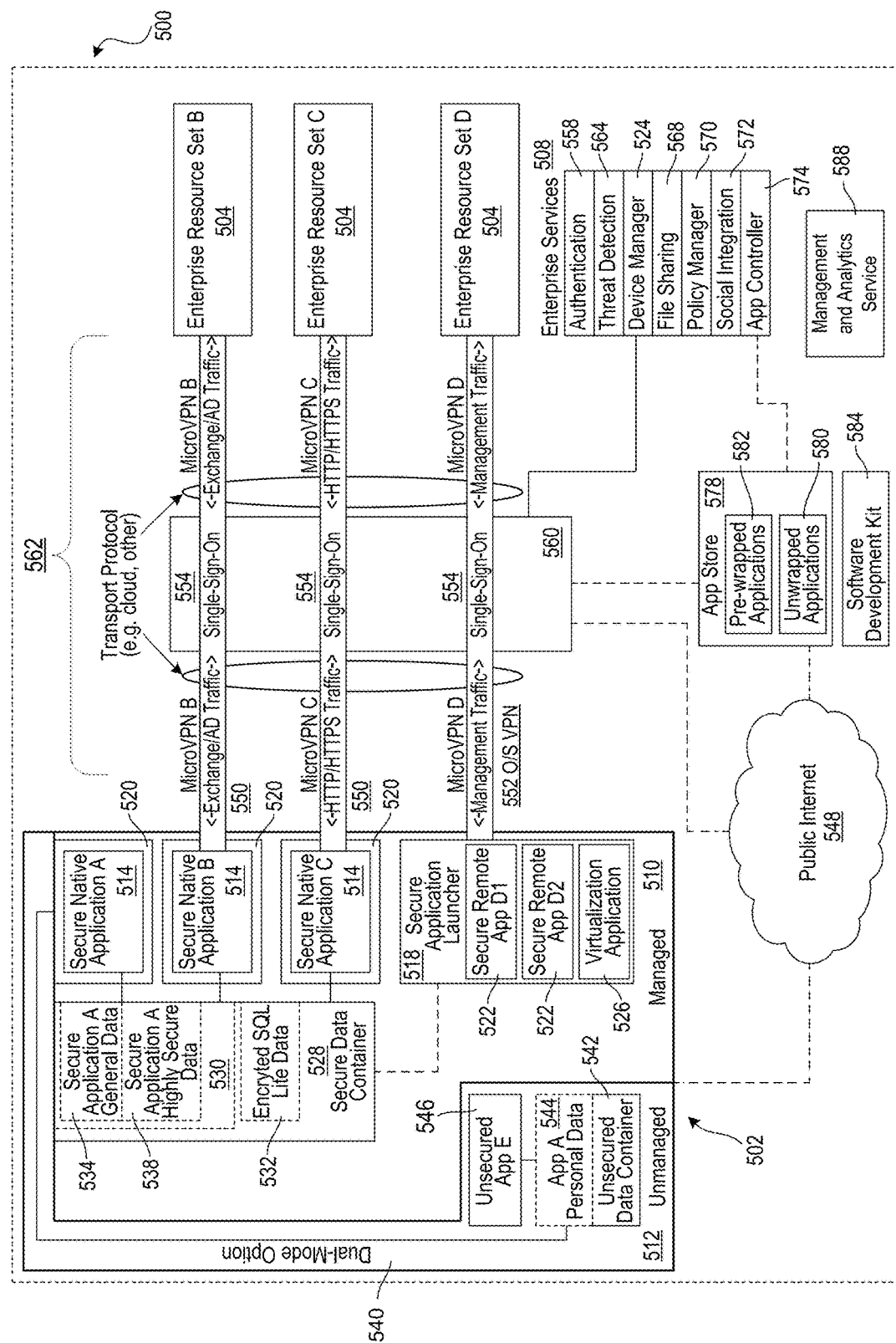
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and Analytics Service 588. The management and analytics service 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Analytics Service

Figure 6:
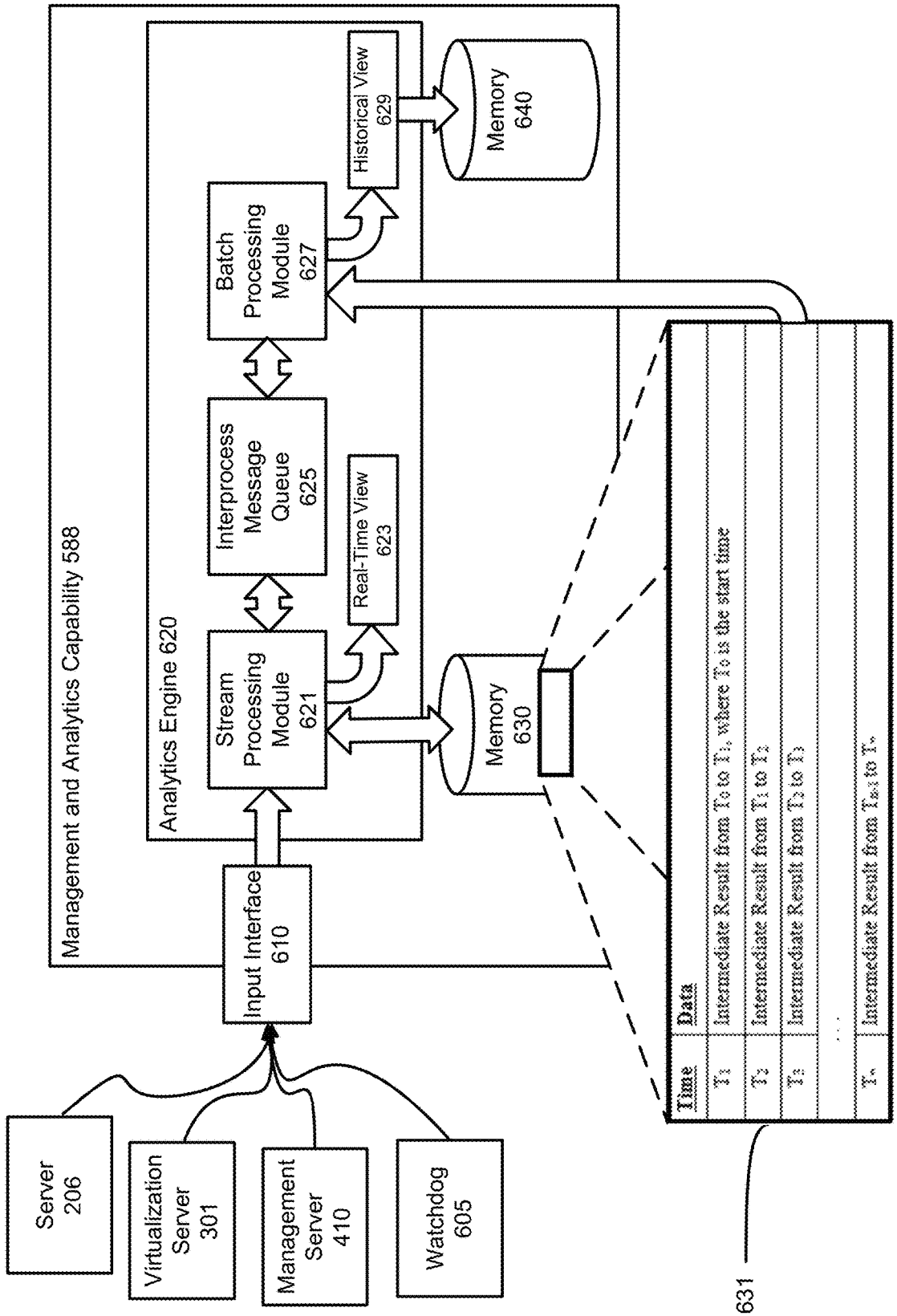
FIG. 6 depicts an illustrative management and analytics service that may be used to generate real-time and historical views of network events in accordance with one or more illustrative aspects described herein.

FIG. 6 shows the Management and Analytics Service 588 that may generate information related to how resources (e.g., computing resources, hosting resources, processing resources, network resources, storage resources, hardware resources, software resources, enterprise resources, personal resources, etc.) are used, how often resources are used, and the like. Additionally, Management and Analytics Service 588 may also generate information related to network-related events, such as the number and quality of user sessions, connection failures, round trip times, logon durations, and the like. As will be discussed in greater detail below, the information related to network-related events may be displayed to a user or administrator to help troubleshoot network-related problems. Alternatively, the information related to network-related events may trigger an abnormal condition that prompts the system to take corrective action to remediate the abnormal condition.

As illustrated, Management and Analytics Service 588 may be executed on and/or otherwise located on a server (not shown), such as server 206, and may include an input interface 610, Analytics Engine 620, a first memory 630, and a second memory 640. Input interface 610 may be any of the networking interfaces discussed above. Additionally, input interface 610 may be configured to establish communications over a network (not shown) with one or more input sources, such as server 206, virtualization server 301, management server 410, or watchdog 605. In this regard, the one or more input sources may provide network events to Management and Analytics Service 588 via input interface 610. Server 206, virtualization server 301, management server 410 may include software, hardware, firmware, or any combination thereof that may be configured to provide network events to Management and Analytics Service 588. Alternatively, watchdog 605 may be installed on server 206, virtualization server 301, management server 410 to provide network events to Management and Analytics Service 588. Watchdog 605 may be software, hardware, firmware, or any combination thereof that may be configured monitor network events and provide the information related thereto to Management and Analytics Service 588. While only one watchdog is illustrated in FIG. 6, any number of watchdogs may be deployed throughout a networking environment.

Once information related to network events is obtained, the information may be passed to Analytics Engine 620. Analytics Engine 620 may be software, hardware, firmware, or any combination thereof that may be configured to parse the network events received from the one or more input sources. Analytics Engine 620 may cause the network events to be displayed to one or more users. In order to process the network events, Analytics Engine 620 may include stream processing module 621, interprocess message queue 625, and batch processing module 627. In data analytics parlance, stream processing module 621 may be referred to as a speed layer, interprocess message queue 625 may be referred to as a query layer, and batch processing module 627 may be referred to as a batch layer. In some embodiments, Analytics Engine 620 may be a single code base that implements a single processing pipeline using stream processing module 621, interprocess message queue 625, and batch processing module 627. Typical systems, such as A-architecture, implement a speed layer, a batch layer, and a query layer. The speed layer and the batch layer are different codes bases that operate on the same stream of data, in parallel, via dual pipelines. The speed layer may process data in real-time, the batch layer may handle large quantities of data, and the query layer may output data from the batch layer and the speed layer. In practice, the speed layer and the batch layer should produce the same results via the different paths. While A-architecture may be useful for providing analytics, its inherent complexity from maintaining separate code bases for the speed layer and the batch layer has limited its influence.

In contrast, the present application describes combining stream processing module 621, interprocess message queue 625, and batch processing module 627 in a single processing pipeline, as a function of a single code base, to provide an advantage over prior art systems, like A-architecture, that divide the processing across multiple pipelines and spread the functionality of these components across multiple code bases. The single processing pipeline described herein may process data in series instead of parallel. As noted above, typical systems execute the speed layer and the batch layer in parallel through two different paths. The single processing pipeline disclosed herein may execute the speed layer (i.e. stream processing) and the batch layer (i.e. batch processing) in series. Utilizing a single processing pipeline, derived from a single code base, reduces the complexity of maintaining multiple code bases and presents a more cost effective solution than prior art systems. Moreover, the single processing pipeline ensures that stream processing module and batch processing module analyze the stream of data to produce the same outcomes based on the analysis performed by the stream processing module and batch processing module. Furthermore, the single processing pipeline and single code base provide better scalability than prior art systems that implement multiple code bases and multiple processing pipelines. In particular, the single processing pipeline and single code base allow for a reduced consumption of processing resources and network bandwidth resources than prior art systems that implement multiple code bases and multiple processing pipelines.

The single processing pipeline may begin with stream processing module 621. Stream processing module 621 may be configured to receive the network events and parse the information contained therein to generate an intermediate result as discussed in greater detail below with respect to FIG. 7. An intermediate result may represent a real-time, or near real-time, status of a network event. Near real-time, as used herein, may be any suitable short-time interval, such as one minute, five minutes, ten minutes, etc. Accordingly, the intermediate result may indicate a network event over a time interval. In some embodiments, the intermediate result may represent an average of the network event between a first time (i.e. $T_{n-1}$) and a second time ($T_n$). After generating the intermediate result, stream processing module 621 may cause the intermediate result to be displayed via real-time view 623. Additionally, stream processing module 621 may store the intermediate result in first memory 630. First memory 630 may be a distributed file system that is capable of storing a plurality of intermediate results 631 received from stream processing module 621 and transferring the plurality of intermediate results 631 to batch processing module 627. Using a distributed file system may allow the analytics capabilities described herein to scale more effectively. Alternatively, first memory 630 may be any suitable network-based file system capable of scaling effectively. In yet further embodiments, first memory 630 may be any suitable storage system, such as a Storage Area Network (SAN).

Next in the single processing pipeline is interprocess messaging queue 625. Interprocess messaging queue 625 may transfer instructions and data between stream processing module 621 and batch processing module 627. For example, interprocess messaging queue 625 may provide a notification to batch processing module 627 to generate a historical view dataset at regular intervals, such as every hour, once a week, once a month, once a year, or the like. Alternatively, interprocess messaging queue 625 may provide notification to batch processing module 627 that a user has requested a custom historical view. For example, the custom historical view may be a timeframe defined by the user. Additionally, interprocess messaging queue 625 may provide the information needed to generate the historical view dataset. In some embodiments, interprocess messaging queue 625 may transfer a plurality of intermediate results from stream processing module 621 to batch processing module 627. In other embodiments, interprocess messaging queue 625 may cause a plurality of intermediate results to be transferred from first memory 630 to batch processing module 627. In further embodiments, interprocess messaging queue 625 may transfer a first plurality of intermediate results from stream processing module 621 and a second plurality of intermediate results to be transferred from first memory 630 to batch processing module 627

The single processing pipeline may conclude at batch processing module 627. Batch processing module 627 may be configured to process a plurality of intermediate results to generate batch data. The batch data may represent a historical view dataset that corresponds to a predefined time interval, such as one hour, one week, one month, or one year. Alternatively, the historical view dataset may be a custom time interval defined by a user. Based on the requested time interval, batch processing module 627 may obtain a plurality of intermediate results from first memory 630. The plurality of intermediate results 631 obtained from first memory 630 may be associated with the requested time interval for the historical view dataset. Batch processing module 627 may generate the batch data from the plurality of intermediate results 631. Once generated, batch processing module 627 may cause the batch data and/or historical view dataset to be displayed via historical view 629. Causing the historical view dataset to be displayed may include generating a visual representation from the historical view dataset. Additionally, batch processing module 627 may store the historical view dataset in second memory 640. In this regard, second memory 640 may be a database, such as a temporal database, that is capable of storing a plurality of historical view datasets.

Figure 7A:
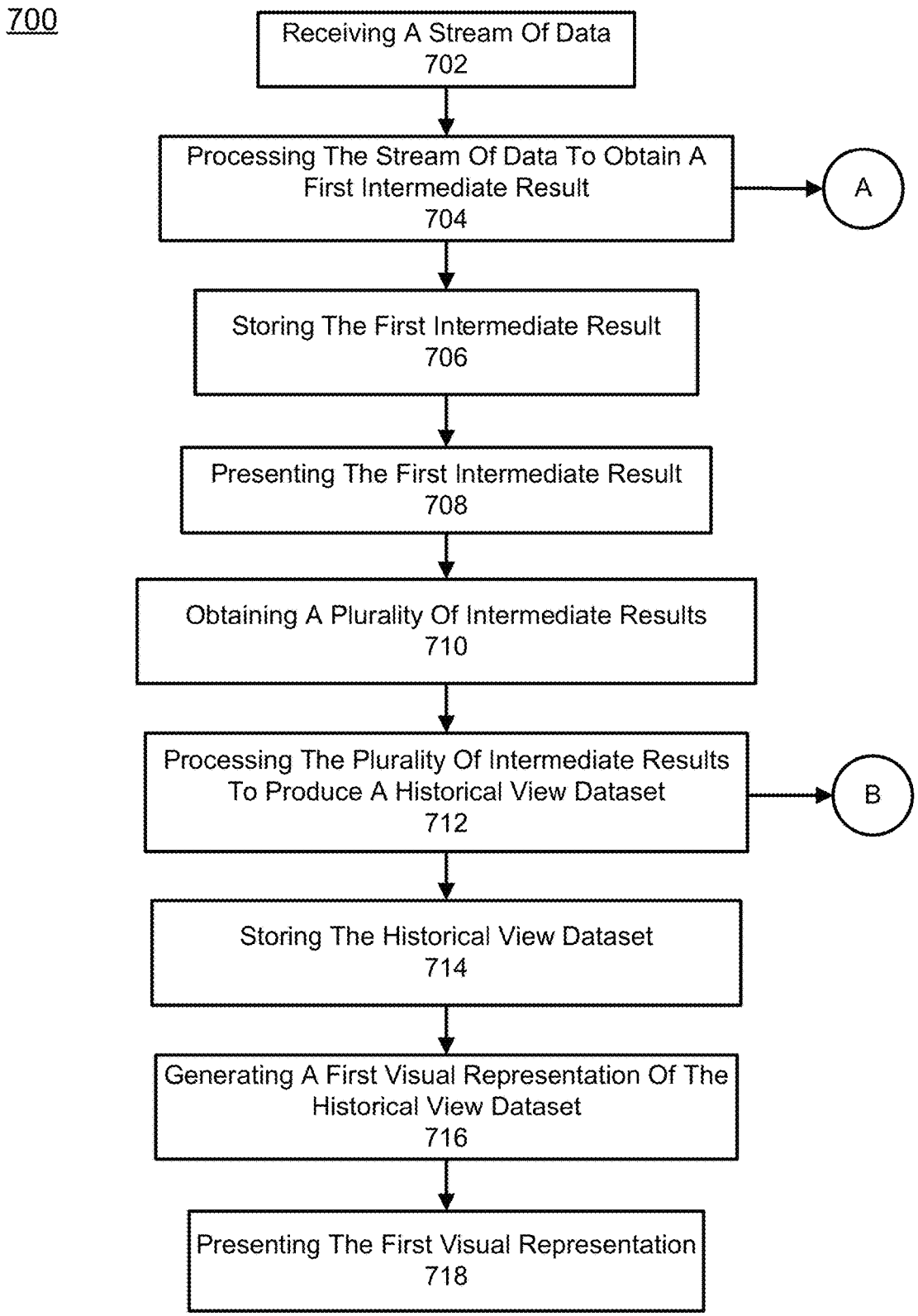
FIGS. 7A-7C depict an illustrative algorithm of a single processing pipeline preparing real-time and historical views of network events in accordance with one or more illustrative aspects described herein.
Figure 7B:
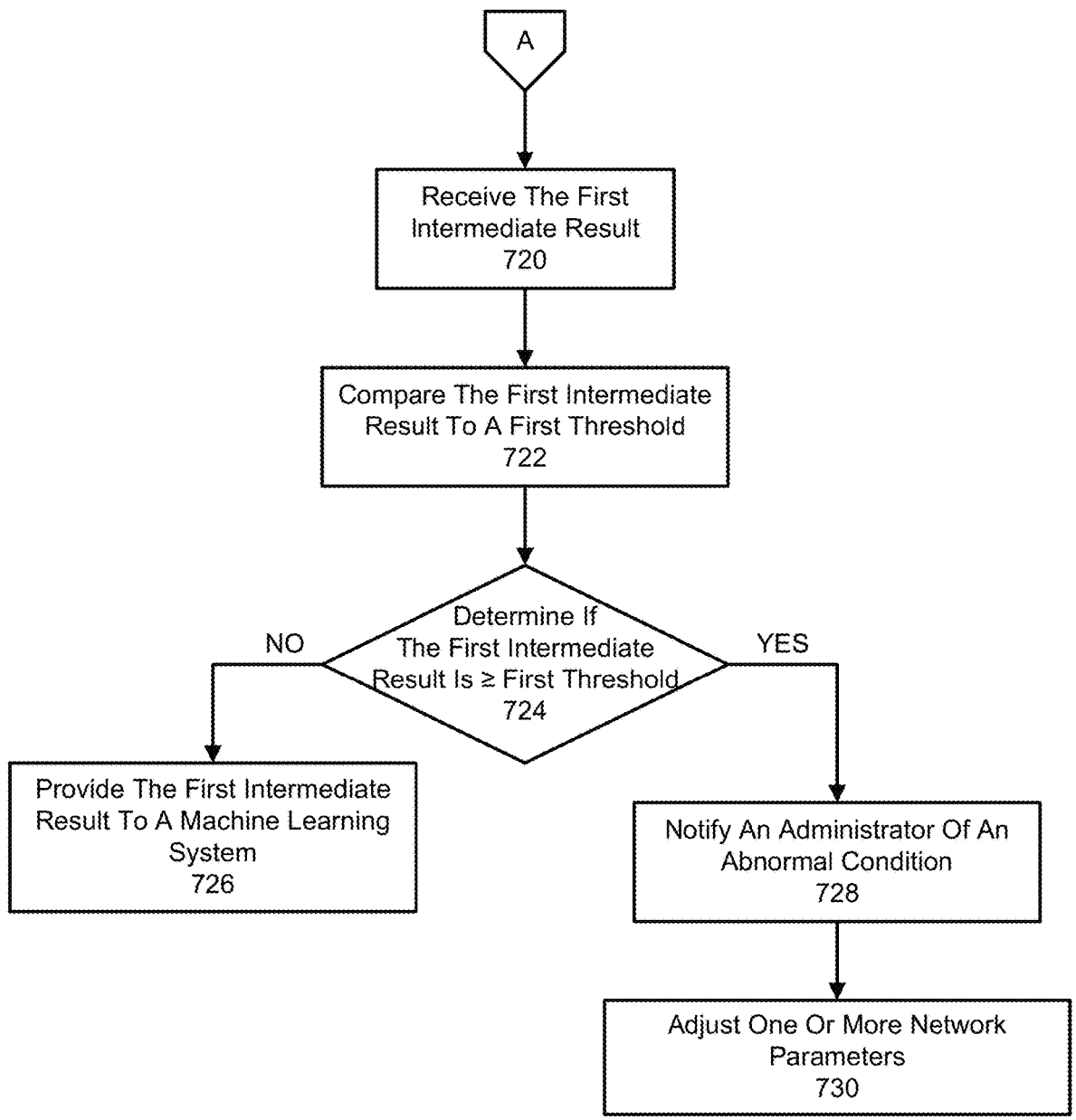
Figure 7C:
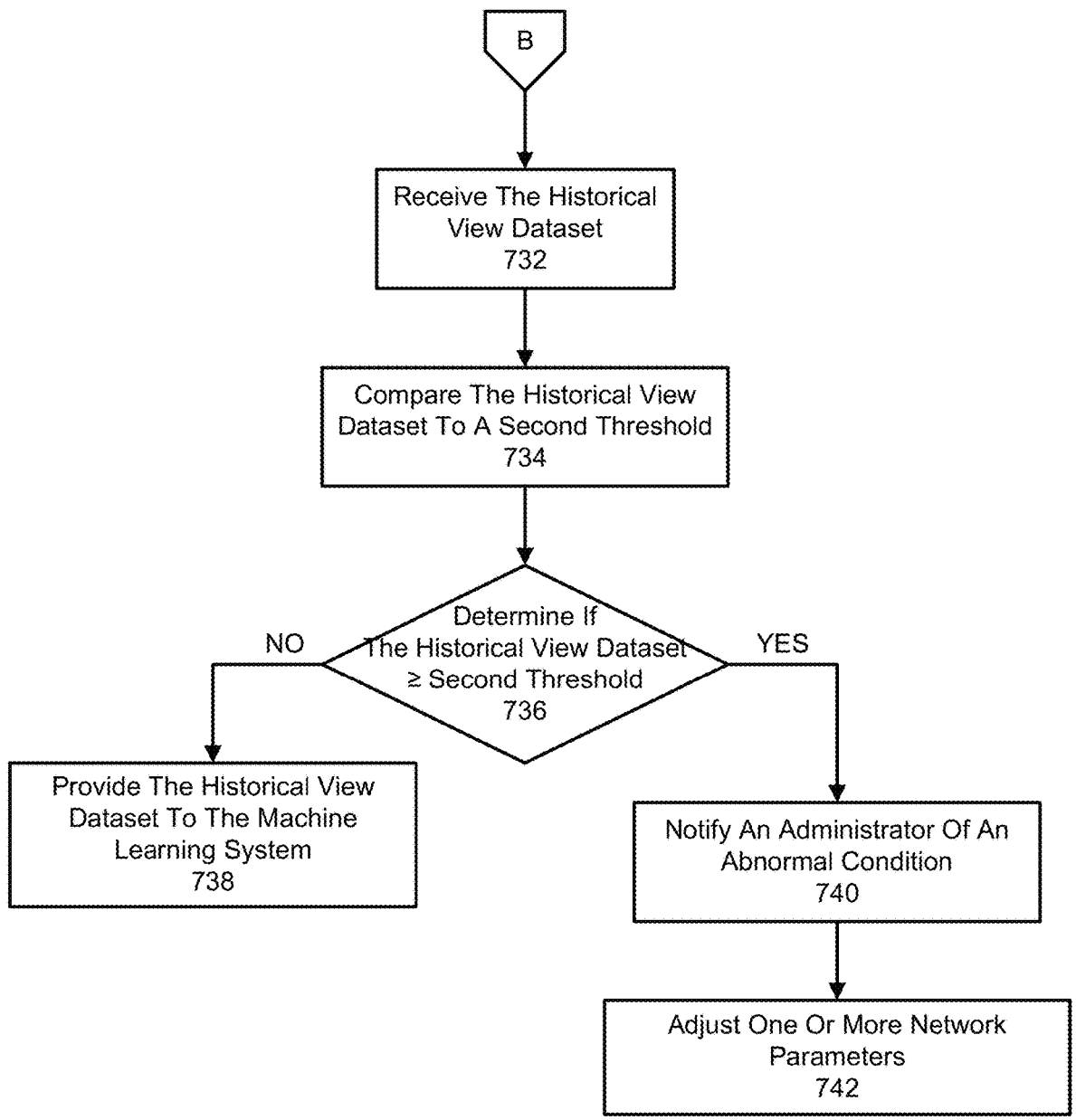

Turning to FIGS. 7A-7C, an algorithm 700 of how the single processing pipeline operates is shown. Algorithm 700 begins in block 702 with a first server, running Analytics Engine 620, receiving a stream of data. The stream of data may comprise one or more network events received, via input interface 610, from the one or more input sources discussed above. In some embodiments, the stream of data may comprise one or more network events represented as serialized data. In block 704, the stream of data may be processed to obtain first intermediate result that represents a network event. In some embodiments, stream processing module 621 may process the stream of data to obtain the first intermediate result. Obtaining a first intermediate result may comprise parsing the stream of data to obtain plurality of intermediate results 631. Parsing the stream of data may include deserializing the stream of data according to a schema. The schema may be defined by the input source, Analytics Engine 620, or any combination thereof, and may define the data types and protocols present in the stream of data. A first intermediate result may be selected from the plurality of intermediate results 631 obtained from parsing the stream of data. In block 706, the first intermediate result may be stored in first memory 630. As noted above, first memory 630 may be a distributed file system that is capable of storing the plurality of intermediate results 631 received from stream processing module 621. The distributed file system described herein may allow the analytics capabilities to scale more effectively. In block 708, the first server and, in particular, the stream processing module, may cause the first intermediate result to be displayed. For example, the first intermediate result may be displayed as a data point in a real-time view. Additionally, the first intermediate result may be displayed on the first server. Alternatively, the first intermediate result may be transmitted over a network and displayed on another server or a user device.

In some embodiments, the first intermediate result may be transmitted to a network monitoring system, which may occur concurrently with or prior to blocks 706 and 708. The network monitoring system may be configured to detect abnormal conditions. FIG. 7B illustrates an exemplary algorithm of evaluating the first intermediate result to detect an abnormal condition. In block 720, the first intermediate result may be received at a network monitoring system from the first server. In block 722, the first intermediate result may be compared to a first threshold value. For example, the first threshold value may be an expected range for the first intermediate result. The first intermediate value may be compared to an expected range. For instance, the expected range may correspond to a range of acceptable roundtrip times. In another example, the first threshold value may be a limit, such as the number of user sessions or logon duration. In this regard, a limit may be set on the number of user sessions due to network condition degradation when the limit on the number of user sessions is exceeded. In another instance, logon duration may be limited to a number of hours. Alternatively, logon duration may be limited to a range of hours (i.e. 8:00 am through 6:00 pm). In block 724, the network monitoring system may determine whether the first intermediate result is greater than or equal to a first threshold. When the first intermediate result is less than the threshold, the first intermediate result may be acceptable. Continuing the examples above, the first intermediate value may be within the expected range of roundtrip times. Similarly, the number of user sessions or logon durations may be below the acceptable limit. These may indicate optimal network conditions. Accordingly, the network conditions, and the first intermediate value, may be provided to a machine learning system to build a first model of the network in block 726. In this regard, one or more components of the network may be determined via one or more network discovery tools. After the one or more components are known, the network conditions and the plurality of intermediate values that satisfy the first threshold value may be processed to determine an optimal network configuration. Processing the network conditions and the plurality of intermediate values may include providing the network conditions and the plurality of intermediate values to a machine learning model, such as a neural network, as training data. The training data may be used to determine an optimized network configuration based on the network conditions and the plurality of intermediate values. Subsequent network conditions and intermediate values may be compared to the optimized network configuration to detect one or more abnormal conditions. Alternatively, or additionally, the first intermediate result may be processed in accordance with steps 706, 708, and 710, set forth in FIG. 7A. When the first intermediate result is greater than or equal to the threshold, an administrator may be notified of the abnormal condition in block 728. Notification may include sending an alert to the administrator, either via email, text, or both. Additionally, notification may include setting a flag on an administrator's console. In block 730, the network monitoring system may adjust one or more network parameters to correct the abnormal condition. For instance, when the number of user sessions is equal to or greater than the first threshold value, desktop virtualization system may provide additional virtual machines for client devices to access. In response to the additional virtual machines being made available for client devices, the first threshold for the number of user sessions may be increased. When the number of user sessions subsequently drops, the first threshold may be lowered. In another example, additional virtual machines may be made available when the logon durations are equal to or greater than the first threshold value. Alternatively, or additionally, client devices may have their connections severed when the logon duration is equal to or greater than the first threshold.

Returning to FIG. 7A, first server may obtain a plurality of intermediate results from the first memory in block 710. As discussed above, batch processing module 627 may obtain the plurality of intermediate results from the first memory at time intervals (e.g. a predetermined or dynamic time interval). Alternatively, batch processing module 627 may obtain the plurality of intermediate results from the first memory in response to a prompt from interprocess messaging queue 625. In block 712, the first server, executing batch processing module 627, may process the plurality of intermediate results to produce a historical view dataset. As will be discussed in greater detail below, batch processing module 627 may generate the historical view dataset from previous historical view datasets. Additionally, or alternatively, batch processing module 627 may use a combination of the plurality of intermediate results and previous historical view datasets to generate the historical view dataset. For example, a user may request a historical view for the past month. Batch processing module 627 may have prepared a first historical view for a first week, a second historical view for the second week, and a third historical view of a third week, but the fourth week has yet to be processed by batch processing module 627. The fourth week may constitute a plurality of intermediate results in first memory 630. Alternatively, the fourth week may constitute six daily historical views in second memory 640 and a day's worth of plurality of intermediate results in first memory 630. Regardless of where the data is located, batch processing module 627 may use a combination of the plurality of intermediate results and previous historical view datasets to generate an up-to-date historical view dataset based on the most recent datasets.

In block 714, the first server may store the historical view dataset in a second memory, such as a temporal database. In block 716, the first server may generate a visual representation of the historical view dataset. According to some embodiments, generating the visual representation may include processing the historical view dataset using a database to generate the visual representation. In block 718, the first server may cause the visual representation of the historical view dataset to be presented. Like the first intermediate result discussed above, the visual representation of the historical view dataset may be displayed on the first server or transmitted over a network and displayed on another server or a user device.

Additionally, the historical view dataset may also be transmitted to a network monitoring system to determine abnormal network events. FIG. 7C illustrates an algorithm for evaluating whether the historical view dataset indicates one or more abnormal network conditions. In some embodiments, the algorithm illustrated in FIG. 7C may occur concurrently with blocks 714, 716, and 718.

Turning to FIG. 7C, a network monitoring system may receive the historical view dataset in block 732. In block 734, the historical view dataset may be compared to a second threshold value. Similar to the first threshold value above, the second threshold value may be a historical range to which the historical view dataset is compared. For example, the historical range may be roundtrip times, number of user sessions, or logon durations during a preceding interval (i.e., 1 week, 1 month, 1 year). Alternatively, or additionally, the historical range may be a chart over the preceding interval. In this regard, the historical view dataset may be compared to the historical range. In some embodiments, the comparison may detect trending data. For instance, if the number of user sessions has been trending up over the preceding interval, the system may notify an administrator and/or provide additional virtual machines to handle the increased number of user sessions. The system may take similar action if the duration of logons appears to be trending upward. In block 736, the network monitoring system may determine whether the historical view dataset is greater than or equal to the second threshold. In this regard, the second threshold may indicate a point where additional resource may be allocated to accommodate additional users. This may be due to a spike in one or more network events. Alternatively, or additionally, crossing the second threshold may be the culmination of the historical range trending upward. When the historical view dataset is less than the threshold, the historical view dataset may be provided to a machine learning system as an input for the first model of the network in block 738. Similar to the plurality of intermediate results, the historical view dataset may be provided as input for the first model to determine an optimal network configuration. In this context, historical view dataset may provide a more accurate picture of optimal network conditions. The historical view dataset provides a larger dataset to the machine learning model. As discussed above, the historical view dataset may be provided as training data initially to determine an optimized network configuration. When the training period concludes, subsequent historical datasets may be compared to the optimized network configuration to detect one or more abnormal conditions. Additionally, or alternatively, the subsequent historical datasets may be sued to update the optimized network configuration by detecting and predicting changes in the network configuration. Alternatively, or additionally, the historical view dataset may be processed in accordance with the steps 714, 716, and 718, set forth above. When the historical view dataset is greater than or equal to the threshold, an administrator may be notified of the abnormal condition in block 740. Notification may include providing an alert to the administrator or setting a flag on an administrator's console. In block 742, the network monitoring system may adjust one or more network parameters to correct the abnormal condition. For example, a desktop virtualization system may allocate more virtual machines for client devices to access based on an indication that the number of user sessions exceeds the second threshold value. Similar to the discussion above, the second threshold value for the number of user sessions may be increased based on the allocation of additional virtual machines. In another example, additional virtual machines may be made available when the logon durations are equal to or greater than the first threshold value.

Figure 8:
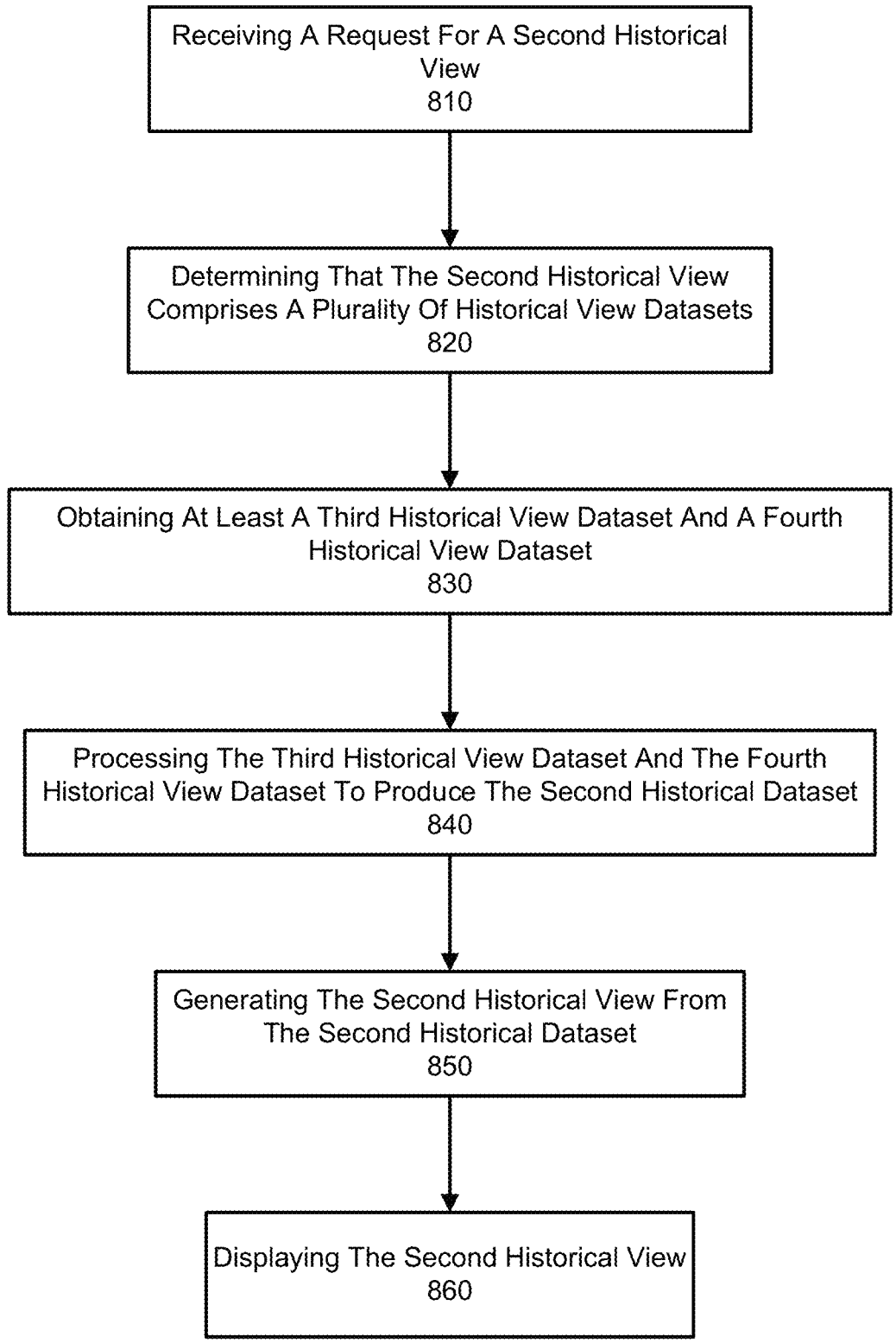
FIG. 8 depicts an illustrative algorithm for generating a historical view of network events in accordance with one or more illustrative aspects described herein.

Occasionally, a user may wish to view a historical view that is not supported by analytics engine 620. That is, the user may request a historical view for a time interval that batch processing module has not prepared. When requests like these are received, stream processing module 621 and batch processing module 627 may coordinate to generate the historical view for the requested time interval. FIG. 8 illustrates an algorithm 800 for generating a historical view based on a request from a user.

Algorithm 800 begins in block 810 with the first server receiving a request for a second historical view. In some embodiments, the request may be received by the stream processing module. The second historical view may be for a user-defined interval, such as the previous two weeks or prior twenty-one days. Alternatively, the user-defined interval may specify a date range. In block 820, the first server may determine that the requested second historical view comprises a plurality of historical view datasets. For example, if the prior twenty-one days are requested, the first server may determine that a third historical view dataset that corresponds to the first week, a fourth historical view dataset that is associated with the second week, and the past weeks' worth of intermediate results are required to generate the second historical view. The first server may access second memory 640, which may be a temporal database that stores a plurality of historical view datasets based on the time periods to which the historical view dataset corresponds. For instance, second memory 640 may associate the first week with January 6-12 (the first full week of 2019) and the second week may be associated with January 13-19 (the second full week of 2019). When the request is made for the prior twenty-one days on January 25th, the first server may determine that the historical view datasets for the time period between January 6 through January 19 are needed. Accordingly, first server may request the first week (i.e., January 6-12) and the second week (i.e., January 13-19) from second memory 640. The most recent week may be obtained from first memory 630. Alternatively, the most recent week may be compiled from daily historical views stored in second memory 640 and the most recent day's intermediate results from first memory 630. The at least third historical view dataset and the fourth historical view dataset may then be transferred from the second memory to the first memory in block 830.

In block 840, the at least third historical view dataset and the fourth historical view dataset may be processed to produce the second historical dataset. In this regard, batch processing module 627 may retrieve the at least third historical view dataset and the fourth historical view dataset from the first memory, and batch processing module 627 may process the data to produce the second historical view dataset, much like batch processing module 627 generates historical view datasets from the plurality of intermediate results. In block 850, the first server may generate the second historical view from the second historical view dataset. As discussed above, this may include generating the second historical view using a database to generate a visual representation. In block 860, the first server may cause the second historical view to be displayed. Like the displays discussed above, the second historical view dataset may be displayed on the first server or transmitted over a network and displayed on an interface on another server or user device. As noted above, historical view datasets may be used to determine trends in the data being monitored and allocate resources based on the determined trends. For instance, the system may allocate additional virtual machines when the number of user sessions and/or the duration of logons are trending upward. Similarly, additional resources may be decommissioned or reallocated for other purposes when the historical view datasets trend downward.

While process 800 has been described as providing a user-defined interval other than those intervals supported by analytics engine (i.e., 12 hours, 1 day, 1 week, 1 month, 1 year), process 800 may also be used to generate the intervals supported by analytics engine. In this regard, batch processing module 627 may obtain a first 12-hour historical view dataset and a second 12-hour historical view dataset from the second memory, transfer the first 12-hour historical view dataset and the second 12-hour historical view dataset to the first memory, and generate a one-day historical view dataset from the first 12-hour historical view dataset and the second 12-hour historical view dataset. Similarly, the process may obtain seven days' worth of historical view datasets and generate a one-week historical view dataset. This process may be repeated to generate historical view datasets as necessary.

Figure 9A:
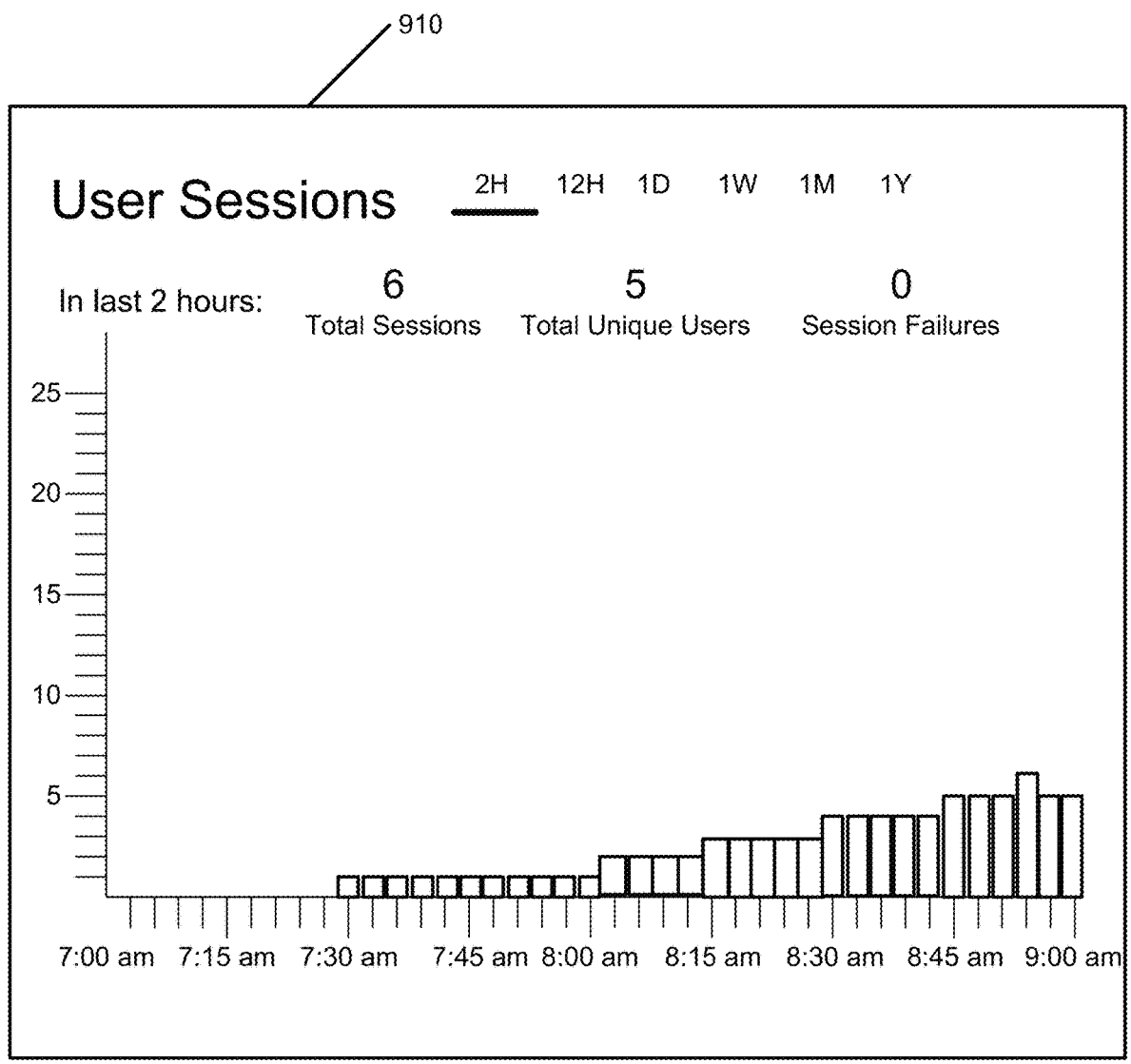
FIGS. 9A and 9B depict examples of real-time views according to one or more illustrative aspects described herein.
Figure 9B:
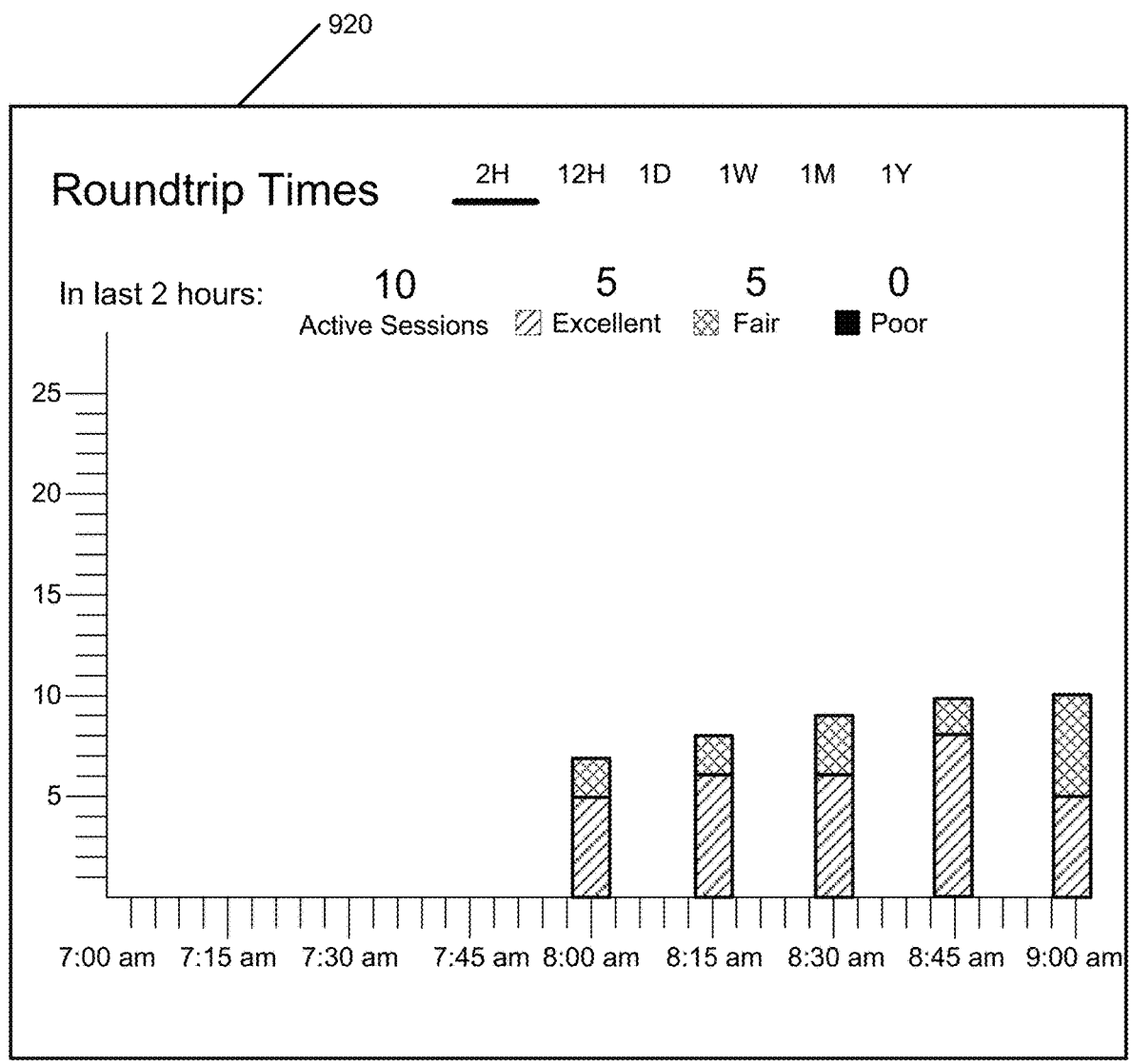

Turning to FIGS. 9A and 9B, examples of real-time views generated by analytics engine 620 according to one or more aspects described herein are shown. Turning to FIG. 9A, real-time view 910 is shown. Real-time view 910 illustrates a two-hour window of User Sessions. In particular, real-time view 910 shows the timeframe between 7:00 am and 9:00 am, with the x-axis representing the elapsing time and the y-axis representing the number of user sessions. Real-time view 910 also shows that the intermediate results may be calculated in three minute intervals. In this regard, each of the plurality of intermediate results illustrated in real-time may be data points on the graph, plotted at three minute intervals. Accordingly, the system may render real-time view 910 from the plurality of plotted data points.

Turning back to FIG. 9A, real-time view 910 shows that there were no user sessions between 7:00 am and 7:30 am. From 7:30 am to 8:00 am, there was one user session, and the number of user sessions continues to increase until 9:00 am. Real-time view 910 may also present a user with options to change the timeframe. In particular, the user may select the previous 12 hours, the past day, the past week, the past month, and the past year. Alternatively, timeframes may be presented to the user in real-time view 910. According to some embodiments, real-time view 910 may include an interface for a user to specify a custom timeframe. Using custom timeframes may be useful in determining when network conditions began deteriorating. Additionally, custom timeframes may provide insight into what caused network conditions to deteriorate. While real-time view 910 illustrates a bar graph to represent the number of user sessions, any type of visual representation, such as a line graph, may be rendered to illustrate the number of user sessions.

Turning to FIG. 9B, real-time view 920, which illustrates roundtrip times, is shown. Similar to real-time view 910, real-time view 920 shows a two-hour window between 7:00 am and 9:00 am, with the x-axis representing the elapsing time and the y-axis representing the number and quality of roundtrip times. Roundtrip times may be used as indicator of network congestion. Accordingly, real-time view 920 illustrates the number and quality of roundtrip times in a stacked bar graph. For example, there are five excellent roundtrip times and two fair round trip times at 8:00 am. At 9:00 am, system performance appears to degrade as indicated by five fair roundtrip times, in addition to the five excellent roundtrip times. In this example, a network administrator may investigate the cause of the five fair roundtrip times. Additionally, or alternatively, one or more network parameters may be adjusted in attempt to remediate the five fair roundtrip times.

Figure 10A:
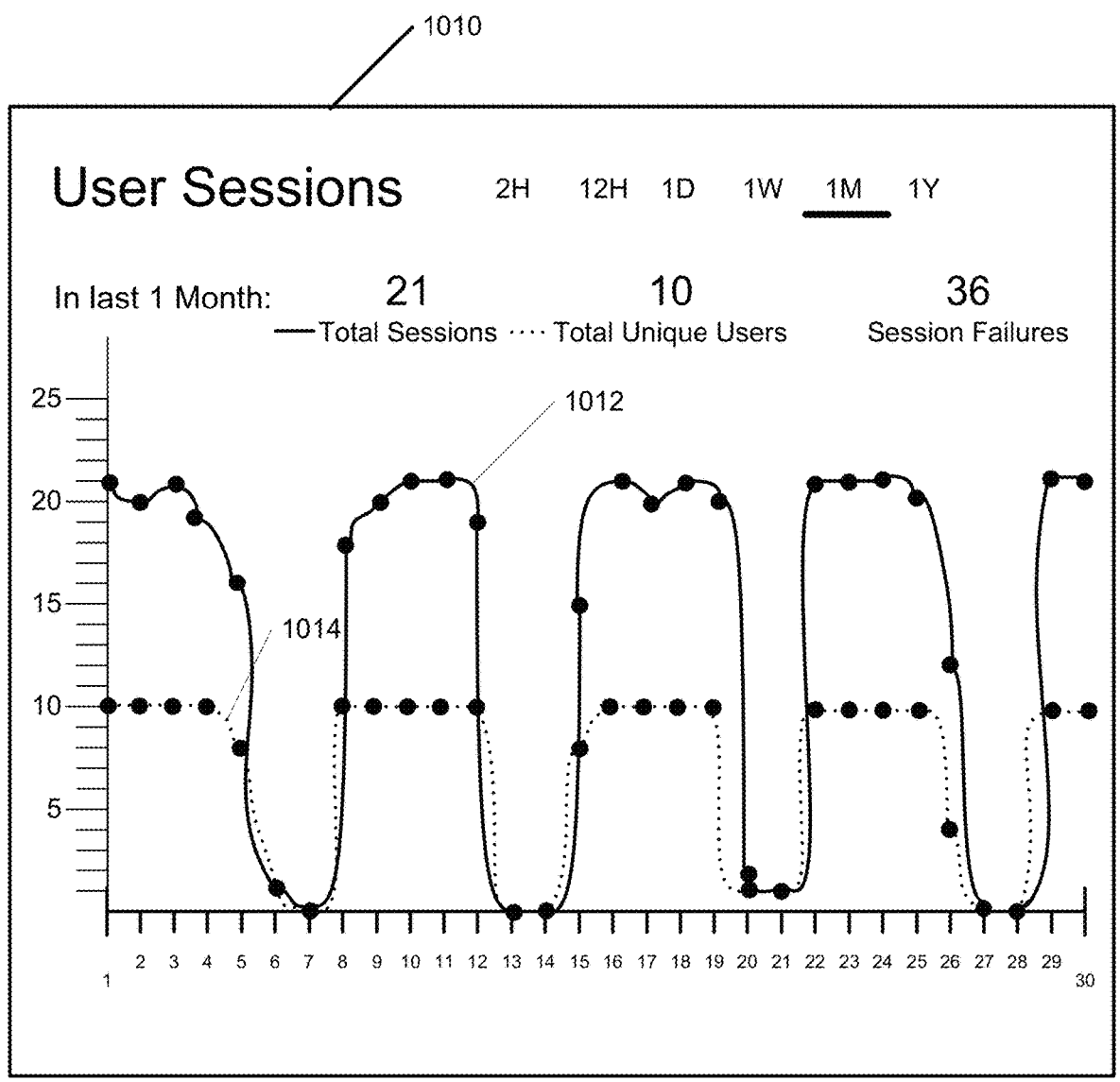
FIGS. 10A-10C depict examples of historical views according to one or more illustrative aspects described herein.

In addition to providing real-time views, analytics engine 620 may provide historical views. FIGS. 9A-9C show examples of historical views generated according to one or more aspects described herein. Turning to FIG. 10A, historical view 1010 is shown and illustrates user sessions over the past month. Historical view 1010 also shows a first line 1012, illustrating the total number of users, and a second line 1014, illustrating the total number of unique users. First line 1012 may comprise a plurality of data points; each may correspond to a network event, such as the number of total user sessions on a particular day. Similarly, second line 1014 may also comprise a plurality of data points to illustrate a network event, such as the total number of unique users on a given day. Historical view 1010 may also include information at the top of the screen, including the total number of user sessions (i.e., 21), the total number of unique users (i.e., 10), and the number of session failures (i.e., 36). Historical view 1010 may depict normal usage, such as a similar number of users Monday through Friday and an expected dip in usage on weekends. This may be useful in detecting abnormal network conditions. For example, the number of user sessions being low when expected to be high, such as during a work week, may be indicative of network issues that need to be remediated. Accordingly, the system may take steps to resolve the network issues and return to the expected number of user sessions.

Figure 10B:
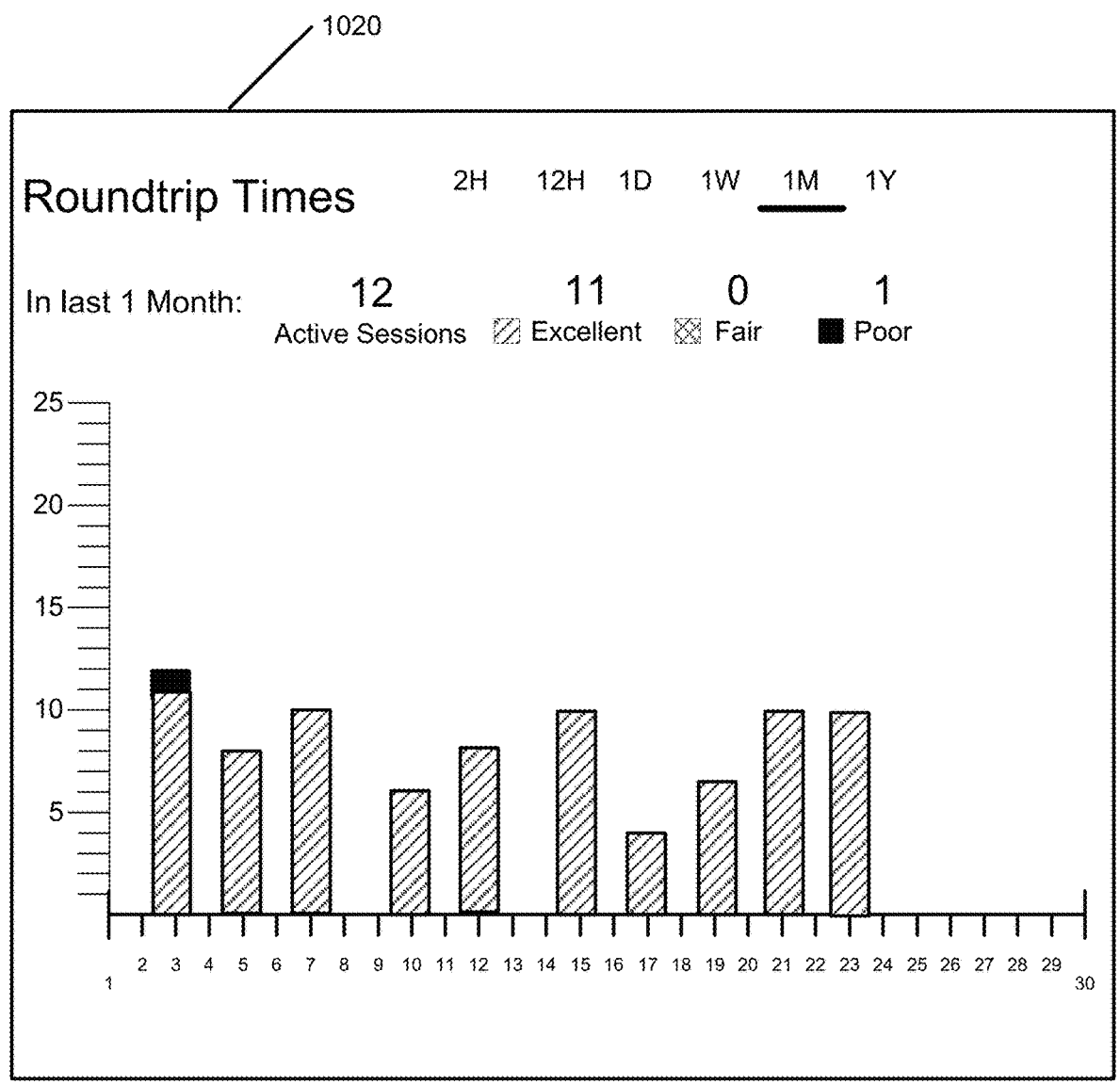

FIG. 10B illustrates an alternative historical view. In particular, historical view 920 illustrates the previous roundtrip times over the previous month. As discussed above with respect to FIG. 9B, roundtrip times may be indicative of network congestion or other problems. Accordingly, historical view 1020 may be useful in detecting periods were roundtrip times degrade. This may provide useful insight to the system and/or administrator to determine what may be causing roundtrip delays to perform at unacceptable levels.

Figure 10C:
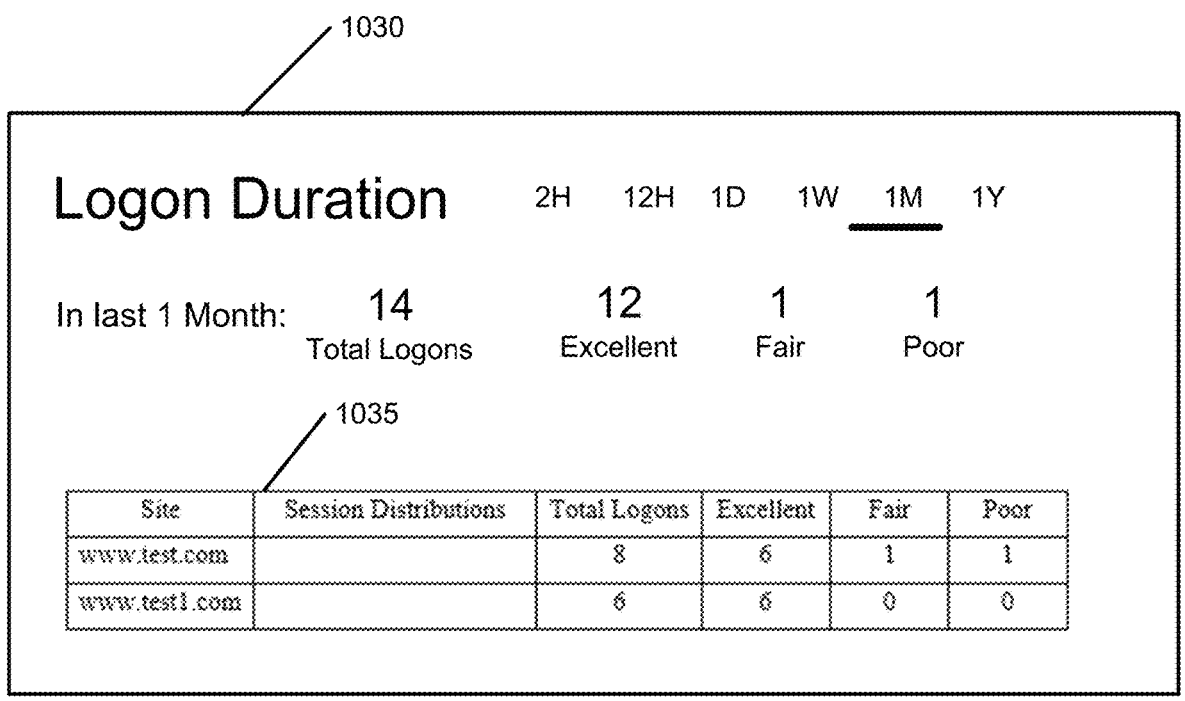

Finally, FIG. 10C shows historical view 1030 of logon durations. Historical view 1030 provides an alternative view of a historical dataset for logon durations. In this regard, historical view 1030 includes table 1035 that indicates the number and quality of logons for two sites. As illustrated, first site (www.test.com) had eight total logons, six were excellent, one was fair, and one was poor; second site (www.testl.com) had six total logons, all of which were excellent. The total number of logons may be displayed textually near the top of historical view 1030. In this regard, the information indicates fourteen total logons, twelve of which were excellent, one was fair, and one was poor.

The Management and Analytics Service described herein may provide a single processing pipeline, as a function of a single code base, to generate real-time and historical views of network events. As discussed above, the single processing pipeline and single code base provide better scalability than prior art systems that implement multiple code bases and multiple processing pipelines. In particular, the single processing pipeline and single code base reduces the consumption of processing resources and network bandwidth resources when compared to prior art systems that implement multiple code bases and multiple processing pipelines. Accordingly, the single processing pipeline and single code base minimizes the complexity of maintaining multiple code bases and presents a more cost effective solution.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:
1. A method comprising:
receiving, by a computing device, a stream of data indicative of a plurality of events of a network;

processing, by the computing device, the stream of data, using a single processing pipeline, to identify data types and protocols contained in the stream of data based on a schema defined by an input source;

generating, using the single processing pipeline, intermediate data and batch data, the intermediate data being generated from the data types and protocols identified in the stream of data and the batch data being generated from at least a subset of intermediate data the generation of the intermediate data and the batch data being done in series with one another by use of the single processing pipeline;

generating, by the computing device, a historical view of the events of the network based on the subset of intermediate data and the batch data; and providing, by the computing device, the historical view to another processing layer to enable the computing device to respond to requests for information about the network.

2. The method of claim 1, comprising:
storing, by the computing device, the intermediate data in a first memory comprising a plurality of intermediate data.

3. The method of claim 1, comprising:
causing, by the computing device, a real-time view of events occurring on the network to be presented based on the intermediate data, wherein the real-time view of events includes a data point corresponding to the intermediate data.

4. The method of claim 1, comprising:
storing, by the computing device, the historical view in a temporal database.

5. The method of claim 1, wherein the single processing pipeline being executable by a single code base.

6. The method of claim 1, comprising:
receiving, by the computing device, a request for a second historical view of a duration;
determining that the second historical view comprises a plurality of batch data;
obtaining a second batch data and a third batch data from a first memory;
processing the second batch data and the third batch data to produce the second historical view; and
causing the second historical view of the duration to be displayed.

7. The method of claim 1, comprising:
generating an alert for an administrator when the intermediate data indicates an abnormal condition.

8. The method of claim 1, comprising:
providing the intermediate data to a machine learning system to build a model of the network.

9. The method of claim 1, comprising:
adjusting one or more network parameters to accommodate additional user devices in response to the intermediate data.

10. The method of claim 1, comprising:
adjusting one or more network parameters to accommodate additional user devices in response to the batch data.

11. The method of claim 1, wherein processing the stream of data to identify data types and protocols contained in the stream of data further comprises:
deserializing the stream of data based on the schema defined by the input source.

12. The method of claim 1, wherein the batch data comprises one or more subsets of intermediate data for a time interval.

13. The method of claim 1, wherein the single processing pipeline comprises an interprocess message queue.

14. A computing device, comprising:
at least one processor; and
memory storing instructions that, when executed by the at least one processor, cause the computing device to:
receive a stream of data indicative of a plurality of events occurring on a network;
process the stream of data, using a single processing pipeline, to identify data types and protocols contained in the stream of data based on a schema defined by an input source;
generate, using the single processing pipeline, intermediate data and batch data, the intermediate data being generated from the data types and protocols identified in the stream of data and the batch data being generated from at least a subset of intermediate data the generation of the intermediate data and the batch data being done in series with one another by use of the single processing pipeline;
generate a historical view of the events of the network based on the subset of intermediate data and the batch data; and
provide the historical view to another processing layer to enable the computing device to respond to requests for information about the network.

15. The computing device of claim 14, wherein the memory stores additional computer-readable instructions that, when executed by the at least one processor, cause the computing device to:
store the intermediate data in a first memory comprising a plurality of intermediate data.

16. The computing device of claim 15, wherein the single processing pipeline being executable from a single code base.

17. The computing device of claim 14, wherein the memory stores additional computer-readable instructions that, when executed by the at least one processor, cause the computing device to:
cause a real-time view of events occurring on the network to be presented based on the intermediate data, wherein the real-time view of events includes a data point corresponding to the intermediate data.

18. The computing device of claim 14, wherein the memory stores additional computer-readable instructions that, when executed by the at least one processor, cause the computing device to:
generate an alert for an administrator when the intermediate data indicates an abnormal condition.

19. The computing device of claim 14, wherein the memory stores additional computer-readable instructions that, when executed by the at least one processor, cause the computing device to:
provide the intermediate data to a system to build a model of the network.

20. One or more non-transitory computer-readable media storing instructions that, when executed by a computing platform comprising at least one processor, memory, and a communication interface, cause the computing platform to:
receive a stream of data indicative of a plurality of events occurring on a network;
process, using a single processing pipeline, the stream of data to identify data types and protocols contained in the stream of data based on a schema defined by an input source;
generate, using the single processing pipeline, intermediate data and batch data, the intermediate data being generated from the data types and protocols identified in the stream of data, and the batch data being generated from at least a subset of intermediate data, the generation of the intermediate and the batch data being done in series with one another by use of the single processing pipeline;

generate a historical view of the events of the network based on the subset of intermediate data and the batch data; and provide the historical view to another processing layer to enable the computing platform to respond to requests for information about the network.

21. The one or more non-transitory computer-readable media of claim 20, wherein the instructions cause the computing platform to:

generate an alert for an administrator when the intermediate data indicates an abnormal condition.

22. The one or more non-transitory computer-readable media of claim 20, wherein the instructions cause the computing platform to:

adjust one or more network parameters in response to the intermediate data.

\* \* \* \* \*